United States Patent [19]

Wheeler et al.

[11] Patent Number: 5,758,003
[45] Date of Patent: May 26, 1998

[54] HIGH DENSITY FIBER MANAGEMENT

[75] Inventors: Todd A. Wheeler, Savage; Timothy J. Haataja, Prior Lake; Paul M. Kmit, Golden Valley, all of Minn.

[73] Assignee: ADC Telecommunications, Inc., Minneapolis, Minn.

[21] Appl. No.: 906,125

[22] Filed: Aug. 5, 1997

Related U.S. Application Data

[63] Continuation of Ser. No. 616,932, Mar. 15, 1996, abandoned.

[51] Int. Cl.⁶ .................................................... G02B 6/36
[52] U.S. Cl. ........................................ 385/134; 385/135
[58] Field of Search .................................. 385/134, 135

[56] References Cited

U.S. PATENT DOCUMENTS

| | | | |
|---|---|---|---|
| 4,630,886 | 12/1986 | Lauriello et al. | 385/135 |
| 4,699,455 | 10/1987 | Erbe et al. | 350/96.2 |
| 4,986,762 | 1/1991 | Keith | 439/131 |
| 4,995,688 | 2/1991 | Anton et al. | 385/135 |
| 5,129,030 | 7/1992 | Petrunia | 385/135 |
| 5,142,606 | 8/1992 | Carney | 385/134 |
| 5,167,001 | 11/1992 | Debortoli et al. | 385/135 |
| 5,335,349 | 8/1994 | Kutsch et al. | 385/135 |
| 5,353,367 | 10/1994 | Czosnowski et al. | 385/135 |
| 5,402,515 | 3/1995 | Vidacovich et al. | 385/135 |
| 5,490,229 | 2/1996 | Ghandeharizadeh et al. | 385/385 |
| 5,497,444 | 3/1996 | Wheeler | 385/135 |

FOREIGN PATENT DOCUMENTS

| | | | |
|---|---|---|---|
| 196102 | 10/1986 | European Pat. Off. | 385/135 |
| 211208 | 2/1987 | European Pat. Off. | 385/135 |
| 406151 | 1/1991 | European Pat. Off. | 385/135 |
| 479226 | 4/1992 | European Pat. Off. | 385/134 |
| 538164 | 4/1993 | European Pat. Off. | 385/135 |
| 2531576 | 2/1984 | France | 385/134 |
| 2587127 | 3/1987 | France | 385/135 |
| 3308682 | 3/1984 | Germany | 385/134 |
| 61-55607 | 3/1986 | Japan | 385/135 |
| 61-90104 | 5/1986 | Japan | 385/135 |

OTHER PUBLICATIONS

PCT Publication No. WO 91/10927, dated Jul. 1991.
Northern Telecom Bulletin #91–004, Issue #2, May, 1991.
AT&T Product Bulletin 2987D–DLH–Jul. 1989, Issue 2, Jul. 1989.

*Primary Examiner*—John D. Lee
*Assistant Examiner*—Ellen E. Kang
*Attorney, Agent, or Firm*—Merchant, Gould, Smith, Edell, Welter & Schmidt, P.A.

[57] ABSTRACT

A fiber distribution frame includes a support structure having a plurality of connector module assemblies mounted in first and second vertical arrays on opposite sides of the support structure. Assemblies of each of the arrays are spaced from one another in a vertical spacing to define a plurality of troughs between each of the assemblies with a plurality of troughs extending rearwardly into rear troughs. A central trough is provided for taking up an excess of fiber extending between the plurality of connector assemblies.

4 Claims, 11 Drawing Sheets

5,758,003

HIGH DENSITY FIBER MANAGEMENT

This is a Continuation of application Ser. No. 08/616,932, filed Mar. 15, 1996(abandoned).

I. BACKGROUND OF THE INVENTION

1. Field of the Invention

This invention pertains to the telecommunications industry. More particularly, this invention pertains to a high density fiber distribution frame for use in the telecommunications industry.

2. Description of Prior Art

In the telecommunications industry, the use of fiber optic cables for carrying transmission signals is rapidly growing. To interconnect fiber optic equipment, fiber distribution frames have been developed. An example of a prior art fiber distribution frame is shown in commonly assigned U.S. Pat. No. 4,995,688. The fiber distribution frame of the '688 patent includes a so-called connector module (item 16 in the '688 patent) having a front panel which carries a plurality of adapters (102) each of the adapters (102) permits attachment of a fiber optic connector (100) to both sides of the adaptor in order to optically couple two fiber optic cables.

Typically, the back side of the adapters (102) are provided with connectors secured to fiber optic cables. The cables are connected to various pieces of fiber optic equipment (such as, fiber-to-copper converter for converting DS-3 signals to optical signals).

The connections on the back side of the adapters are semi-permanent. Namely, while the connectors on the back side of the adapters can be easily removed, they are normally installed with the intent to maintain the connection of the connector to the rear side of the adapter without frequent future changes to the connection. On the front side of the adapter, the fiber optic connector is secured by a cable (for example, a jumper cable) for cross-connecting to other pieces of optical equipment or to any other destination.

With the increase in use of fiber optic cables in the telecommunications industry, it is desirable to provide fiber distribution frames with increased density. By density, it is meant the number of locations per unit volume or unit area for providing connection on the fiber distribution frame.

An example of a high density fiber density distribution frame is shown in commonly-assigned U.S. Pat. No. 5,497,444 issued Mar. 5, 1996. The '444 patent shows a plurality of modules (for example, module 58 in FIG. 18 of the '444 patent) which contain an array of adapters 90 for receiving fiber optic connectors. The modules are moved in a direction (A) which is parallel to the linear array of adapters carried on the modules. In the example shown in FIG. 18 of the '444 patent, each module contains six adapters and the entire module can be moved up or down to permit access to connectors carried on the adapters 90. As mentioned in the '444 patent, this design prevents undesired excess movement of fiber optic cables. Also, as mentioned in the '444 patent, the modules need not be in continuous arrays of six but could be split so that a portion of the array can be moved in one direction and a second portion of the array can be moved in an opposite direction. FIG. 1 of the '444 patent shows a distribution frame incorporating the modules 58 where the modules are disposed all in vertical alignment and in side-by-side positions.

One problem associated with high density fiber distribution frames is the need for enhanced management of cables in order to provide enhanced organization to fiber optic cables carried on the frame. Also, it is necessary to avoid excessive bending to fiber optic cables. And in addition, the high density requires access to the various connectors for a technician to make necessary changes to fiber optic connections from time to time.

It is an object of the present invention to provide a fiber distribution frame which permits high density, ready access and enhanced fiber management.

II. SUMMARY OF THE INVENTION

According to a preferred embodiment of the present invention, a cable management distribution system is disclosed having a fiber distribution frame carrying a plurality of fiber connector assemblies. The assemblies are disposed in two spaced-apart vertical columns with a vertical central trough disposed between the two columns. A plurality of fiber optic guides define a fiber pathway from any one of the plurality of assemblies in the first column to any one of the plurality of assemblies in the second column. A lower end of the central trough receives excess lengths of cables with the central trough having a plurality of supports positioned along its vertical length for looping cable lengths over the supports.

III. BRIEF DESCRIPTION OF THE DRAWINGS

IV. DESCRIPTION OF THE PREFERRED EMBODIMENT

With reference now to the several drawing figures in which identical elements are numbered identically throughout, a description of the preferred embodiment of the present invention will now be provided.

Figure 1:
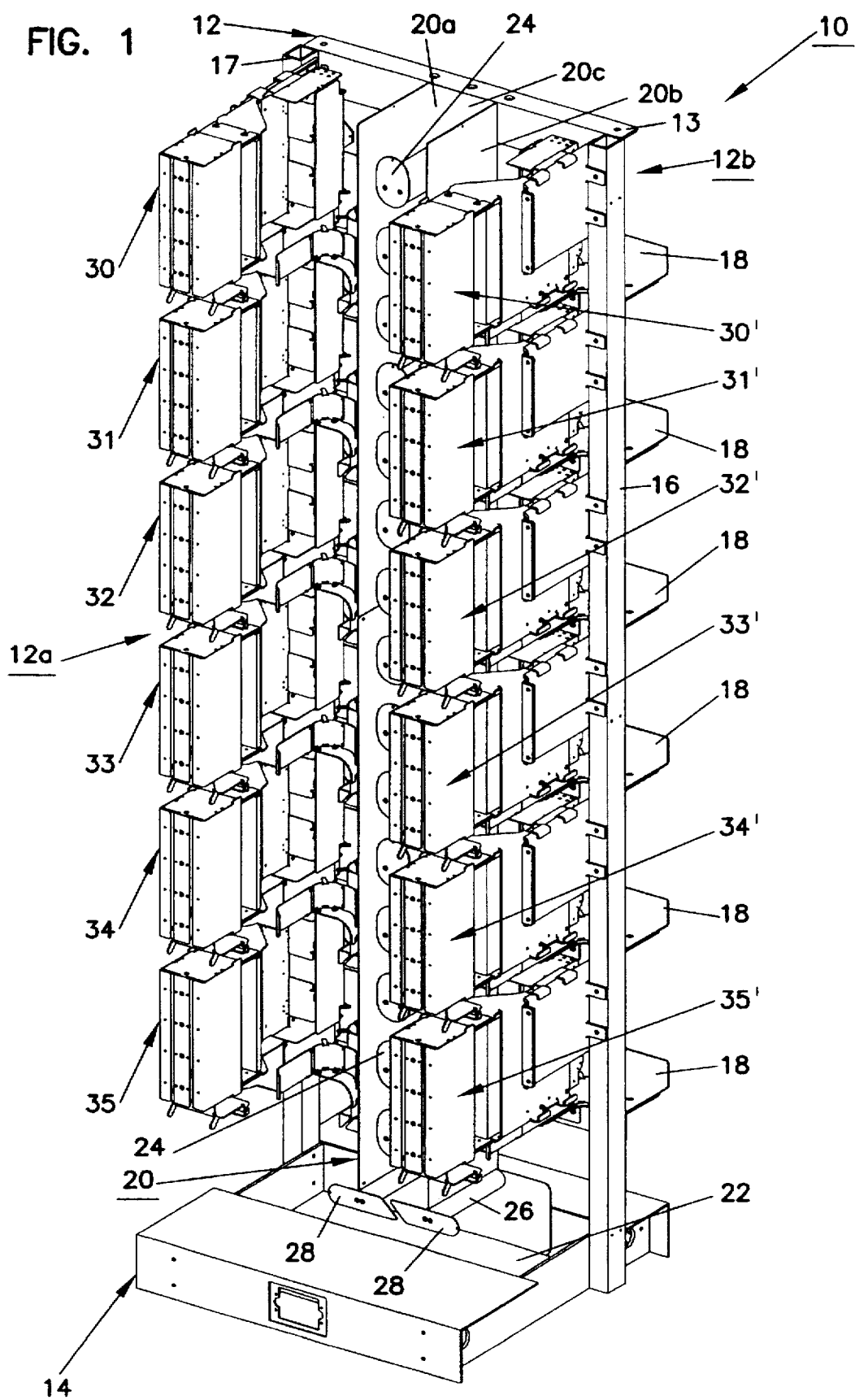
FIG. 1 is a front, top and right side perspective view of a high density fiber distribution frame according to the present invention.
Figure 2:
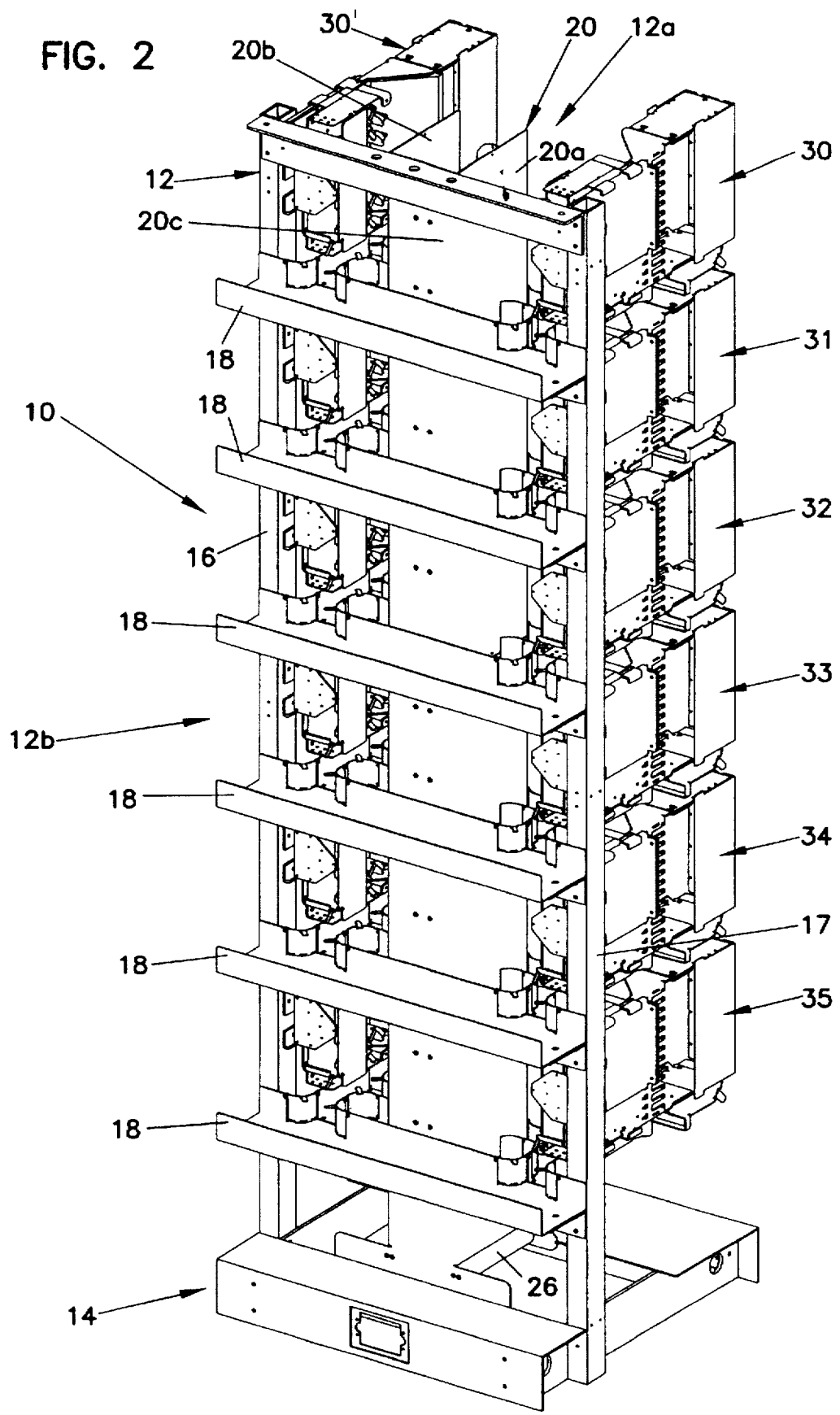
FIG. 2 is a rear, top and left side perspective view of the frame of FIG. 1.
Figure 3:
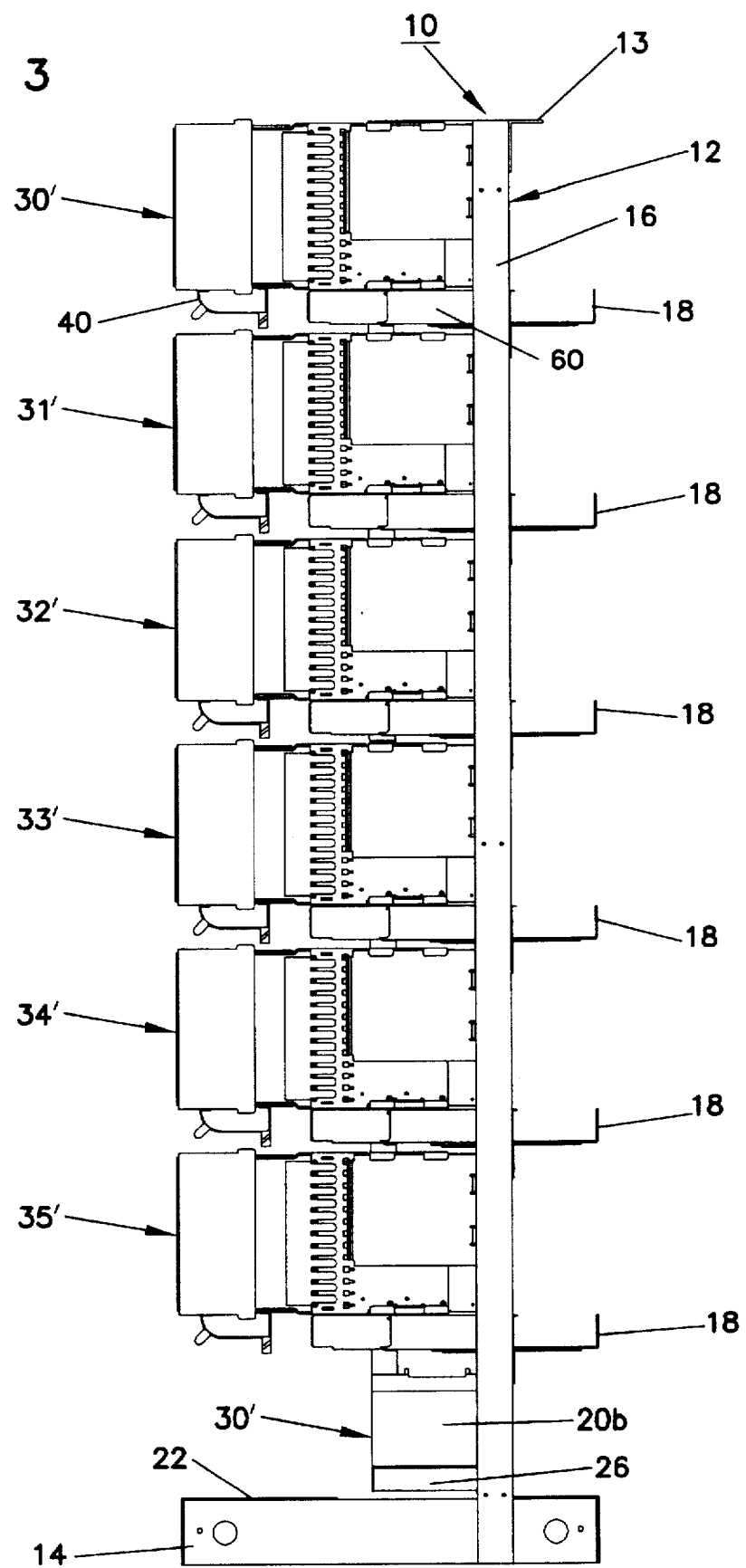
FIG. 3 is a right side elevation view of the frame of FIG. 1.

With initial reference to FIG. 1, a fiber distribution apparatus 10 is shown including a support frame 12 mounted on a base member 14 for holding the support frame 12 vertically extending from the base 14.

The frame 12 includes spaced-apart and parallel vertical support posts 16,17 extending the height of the frame 10. The support posts 16,17 are connected at their upper ends by a cross-bracing 13.

On a rear side 12b of the frame 12, the posts 16,17 are joined on the rear of the frame by a plurality of generally U-shaped troughs 18. Rear troughs 18 are horizontal and open on their top sides so that cable can be laid within the troughs 18 and be supported by the rear troughs 18. The troughs 18 are spaced apart along the vertical height of the frame 12.

On the front side of the frame 12a, a vertical and centrally positioned U-shaped trough 20 is provided. The trough 20 is vertically aligned and is open to the front 12a of the frame 12. Vertical trough 20 includes side walls 20a, 20b and a back wall 20c. Wall 20c is rigidly secured to the top brace 13 and rear troughs 18. The side walls 20a, 20b terminate at their lower ends spaced from base member 14. Base 14 includes a base trough 22 which is accessible from the vertical trough 20.

Positioned within vertical trough 20 are a plurality of spools 24. Radius limiters 26 are provided at the lower terminal end of the vertical trough 20. The radius limiters 26 are capped with clips 28 to permit passage of fiber optic cables between the spacing of the clips 28 and into the vertical trough 20 such that fibers can be passed from the base trough 22 into the vertical trough 20 as will be more fully described.

A plurality of fiber optic connector assemblies 30–35 are connected to post 17. Similarly, a plurality of assemblies 30'–35' are secured to post 16. Assemblies 30–35 and 30'–35' are identical except only that assemblies 30'–35' are mirror images of assemblies 30–35. Accordingly, a description of assembly 30 with reference to FIGS. 7–11 will suffice as a description of assemblies 31–35 and 31'–35'.

Before proceeding with a description of the assembly 30, it will noted that on support post 17, assemblies 30–35 are disposed in a vertical array with each of the assemblies spaced apart from one another. Further, the assemblies 30'–35' on post 16 are disposed in a vertical array with assemblies of 30–35 aligned with opposing assemblies 30'–35' (e.g., assemblies 30,30' are in spaced-apart, horizontal alignment). The aligned assemblies 30–35 and 30'–35' are spaced apart in a horizontal direction to permit unobstructed access to vertical trough 20 as well as permitting unobstructed access to each of the assemblies 30–35, 30'–35' by a technician. Aligned pairs of assemblies 30–35, 30'–35' (e.g., horizontally aligned assemblies 32, 32') are also aligned with an individual one of rear troughs 18 for reasons that will become apparent.

Figure 10:
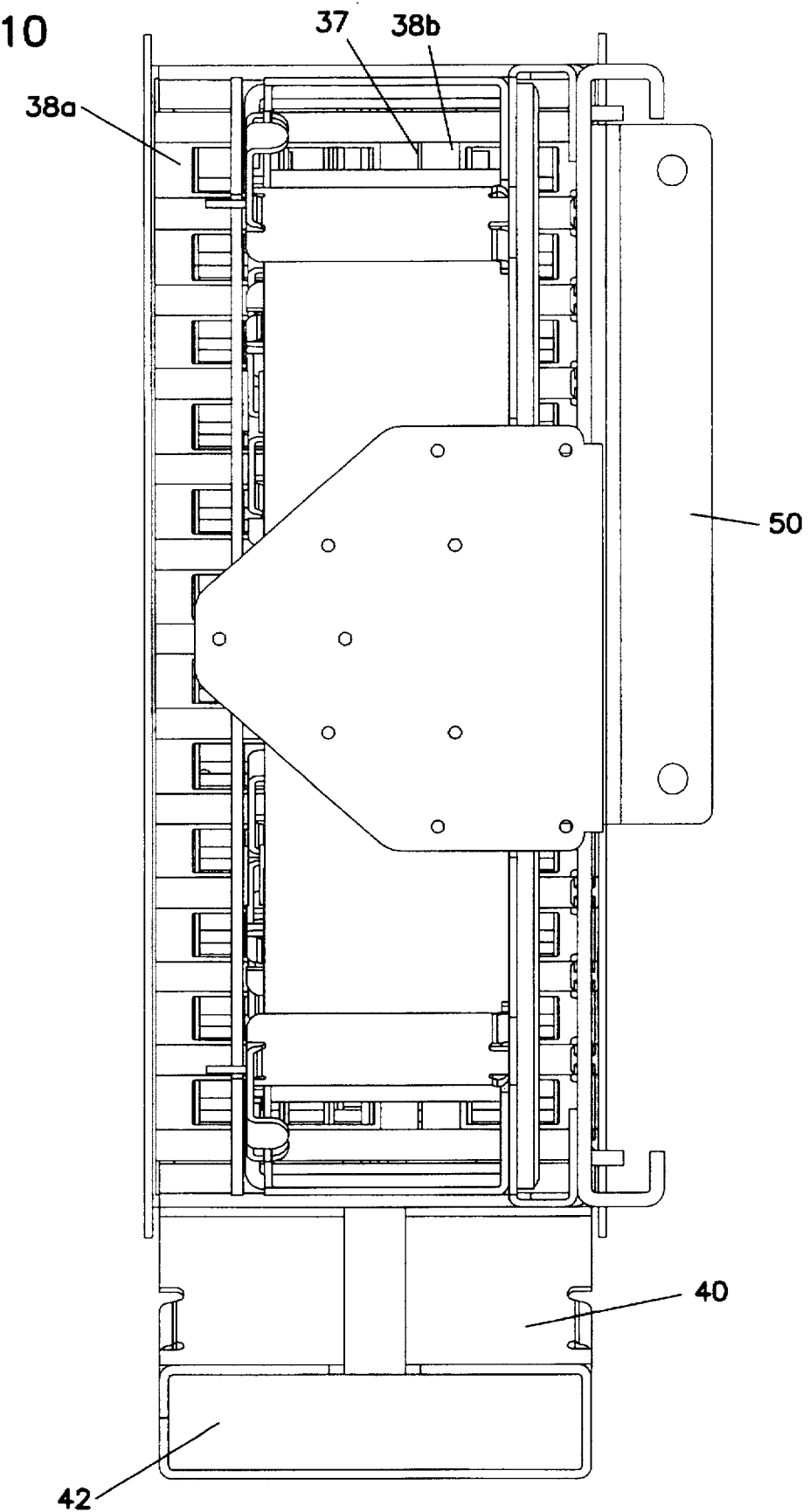
FIG. 10 is a rear elevation view of the connector assembly of FIG. 7.
Figure 11:
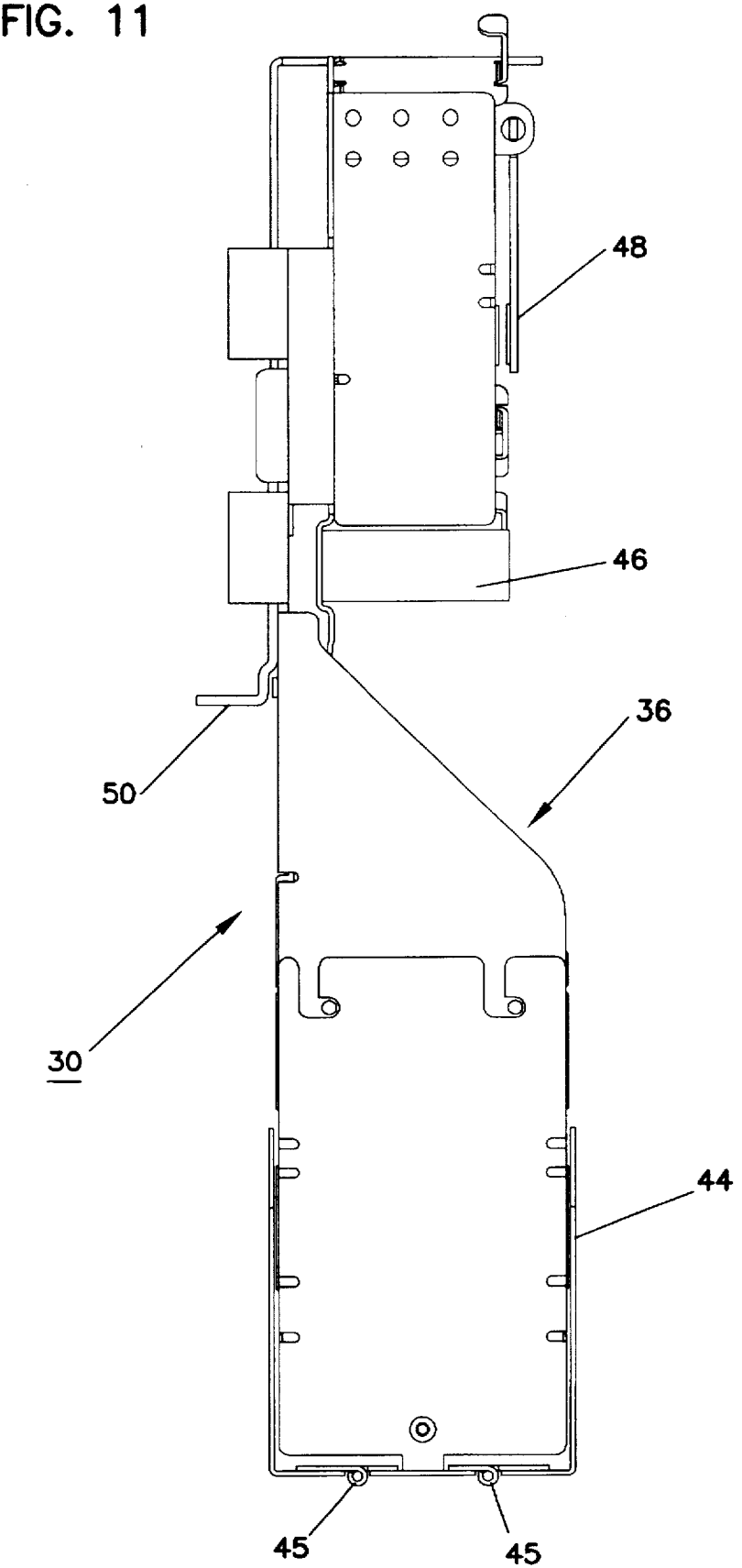
FIG. 11 is a top plan view of the connector assembly of FIG. 7.

With reference to FIGS. 7–11, the assembly 30 includes a support frame 36. Carried on the support frame 36 are a plurality of connector modules 38. Each of the connector modules 38 may be such as those disclosed as numeral 58 in the aforementioned '444 patent. The modules 38 each contain a plurality of fiber optic adapters (not shown in the present application but taught in the '444 patent) for permitting connection of a fiber optic cable to the front of each module 38 and a second fiber optic cable to the rear of each module 38 at each of the adapters. The modules 38 are shown split at 37 such that the modules 38 may contain an inside half 38a and an outside half 38b (FIG. 10). Inside half 38a may contain, in a preferred example, four fiber optic adapters while outside half 38b may contain two fiber optic adapters.

The adapters on halves 38a,38b are aligned in a linear array parallel to the longitudinal dimension (i.e., horizontal in the figures) of the connector modules 38. The halves 38a,38b are independently slidably movable in a horizontal direction. Therefore, half 38a may be moved from the retracted position (shown in FIG. 7) to an extended position by pulling half 38a toward the center of the frame 12. By individually sliding a half 38a to the extended position while retaining all other halves 38a of assembly 30 in the retracted position, the fiber optic connections on the extended half 38a are more readily available to a technician. Following work by a technician, the half 38a can be returned to the retracted position. Similarly, halves 38b are independently slidable outwardly away from the center of frame 12 for access. As the halves 38a, 38b are moved, any fiber optic cables which are connected to each of the halves 38a, 38b are also moved. This structure has the benefits of the '444 patent in that it is possible to access a given connector by requiring only a small incremental movement of the connector. The details of the modules 38 and the adapters contained on the modules 38 are not shown but reference is made to U.S. Pat. No. 5,497,444 incorporated herein by reference which teaches such modules 38.

Unlike the '444 patent (which shows modules positioned to slide vertical but suggests other orientations), the assemblies 30–35, 30'35' are mounted so that all modules 38 of all assemblies 30–35, 30'–35' slide in horizontal lines of travel which are parallel and spaced from a plane defined by support posts 16,17.

Fiber optic cables which are connected to the front of the modules 38 will extend away from the front face of the modules 38 in a direction generally perpendicular to the plane defined by posts 16,17. It is necessary to direct such fiber optic cables rearwardly toward troughs 18. Accordingly, the cables may be directed around a radius limiter 40 and through a retaining clip 42. To protect the looped fiber optic cables, a plurality of hinged doors or covers 44 are secured to the frame 36 such that the covers 44 protect the looped cables extending from modules 38 and around radius limiter 40. The doors 44 may be opened by pivoting along their vertical hinges 45 to permit increased ease of access to the connector modules 38. The rear side of the assembly 30 (i.e., a side of connectors 38 opposite doors 44) includes a plurality of fanning clips 46 for directing a second set of fibers to the rear side of the modules 38. A protective cover 48 protects the fibers extending through the clips 46.

Each of the assemblies 30–35 includes a mounting bracket 50 (FIG. 11) secured to the frame 36. The bracket 50 is secured to the support 17 to mount each of the assemblies 30–35 on the support 17. Similarly, each of assemblies 30'–35' are mounted on support 16.

Figure 6:
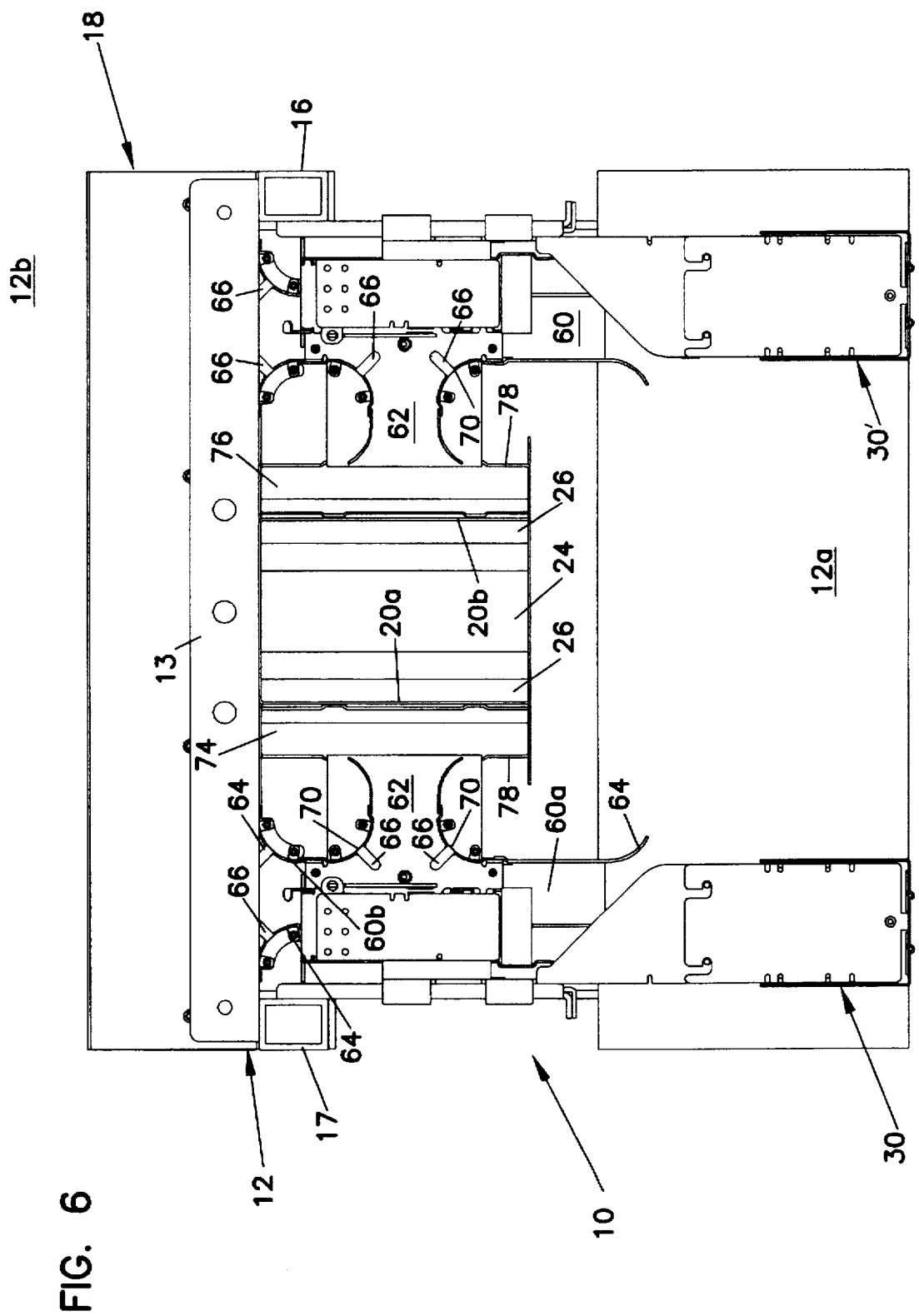
FIG. 6 is a top plan view of the frame of FIG. 1.
Figure 7:
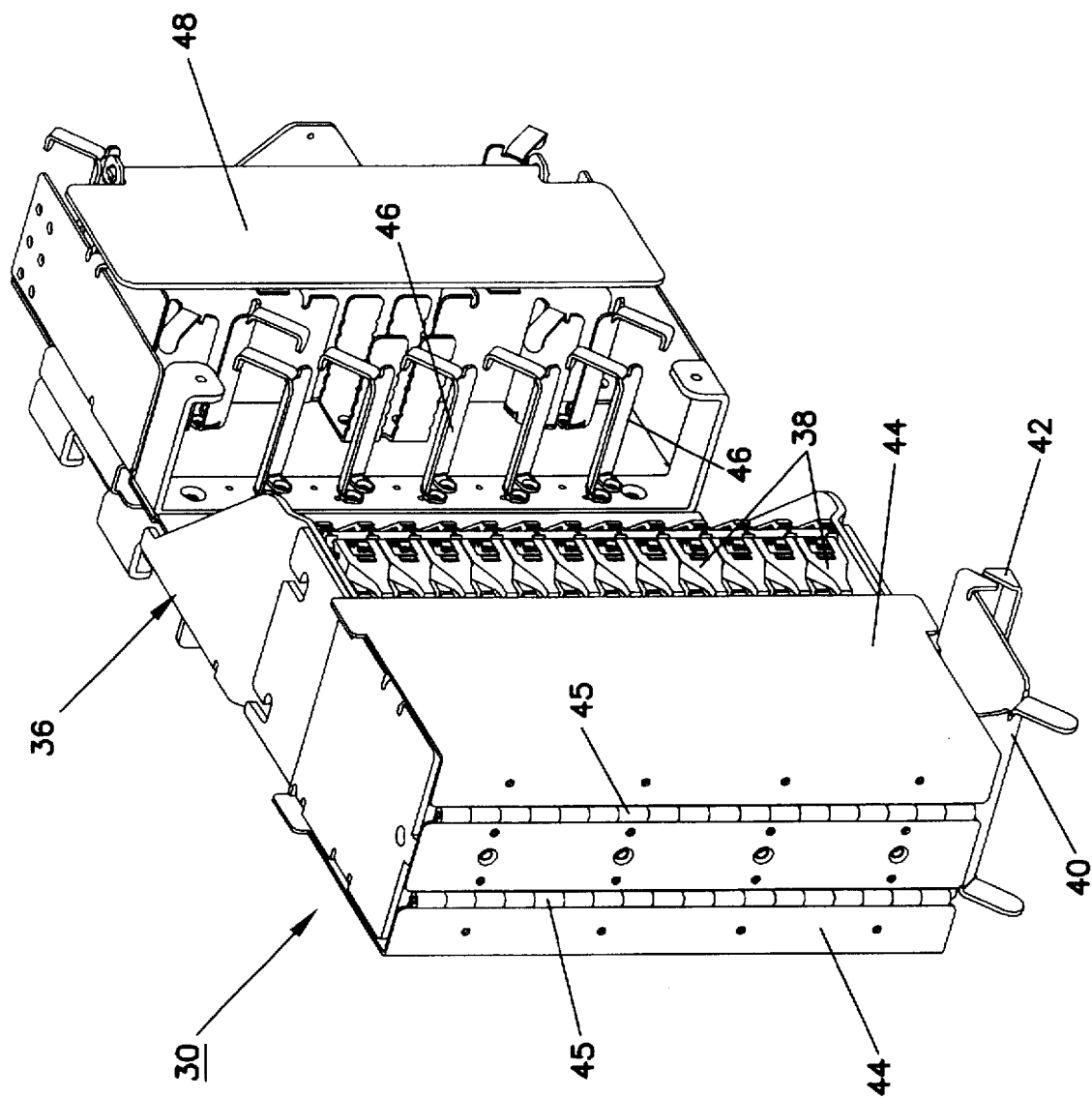
FIG. 7 is a front, top and right side perspective view of a fiber optic connector assembly for use in the frame of FIG. 1.
Figure 8:
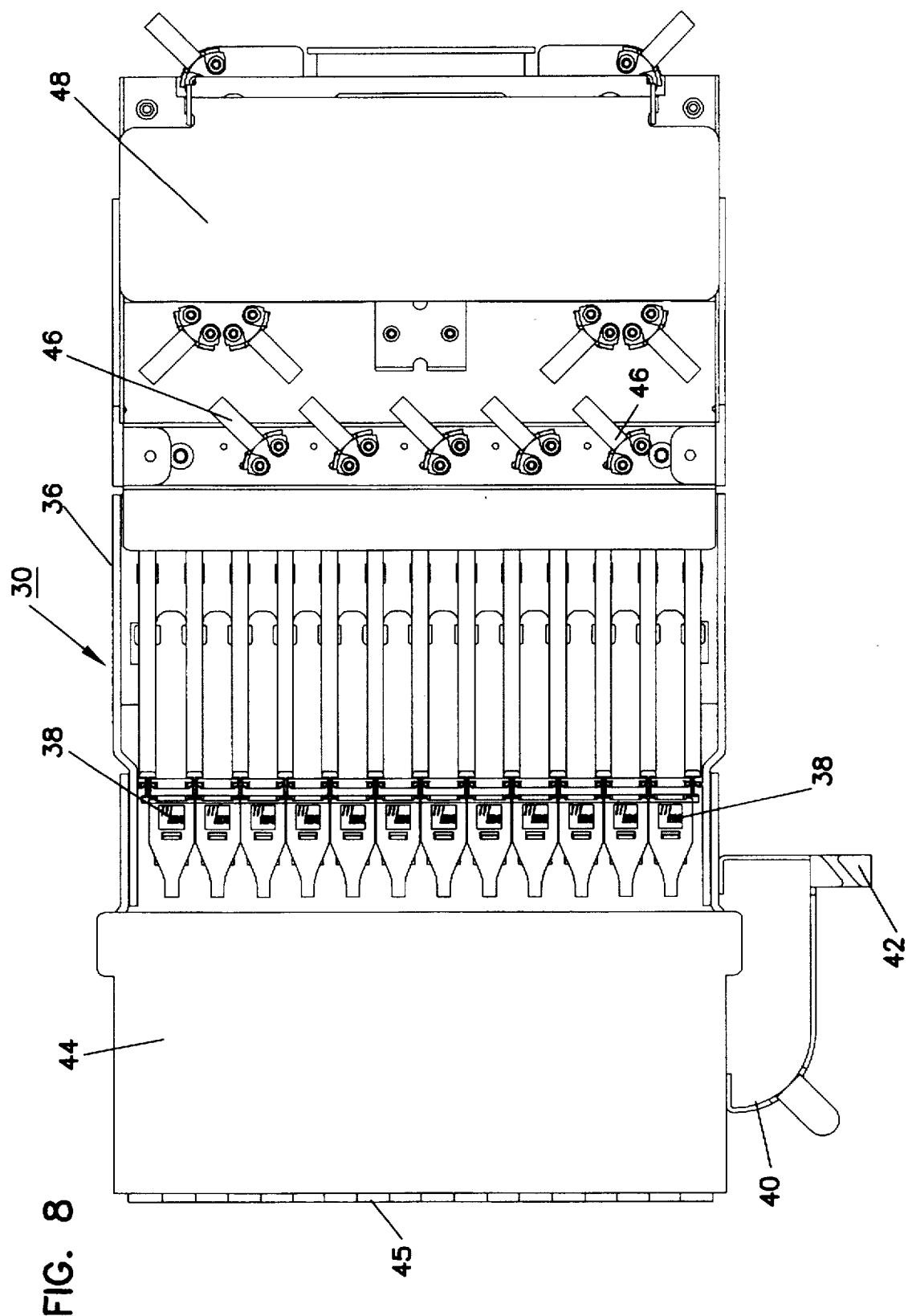
FIG. 8 is a right side elevation view of the connector assembly of FIG. 7.
Figure 9:
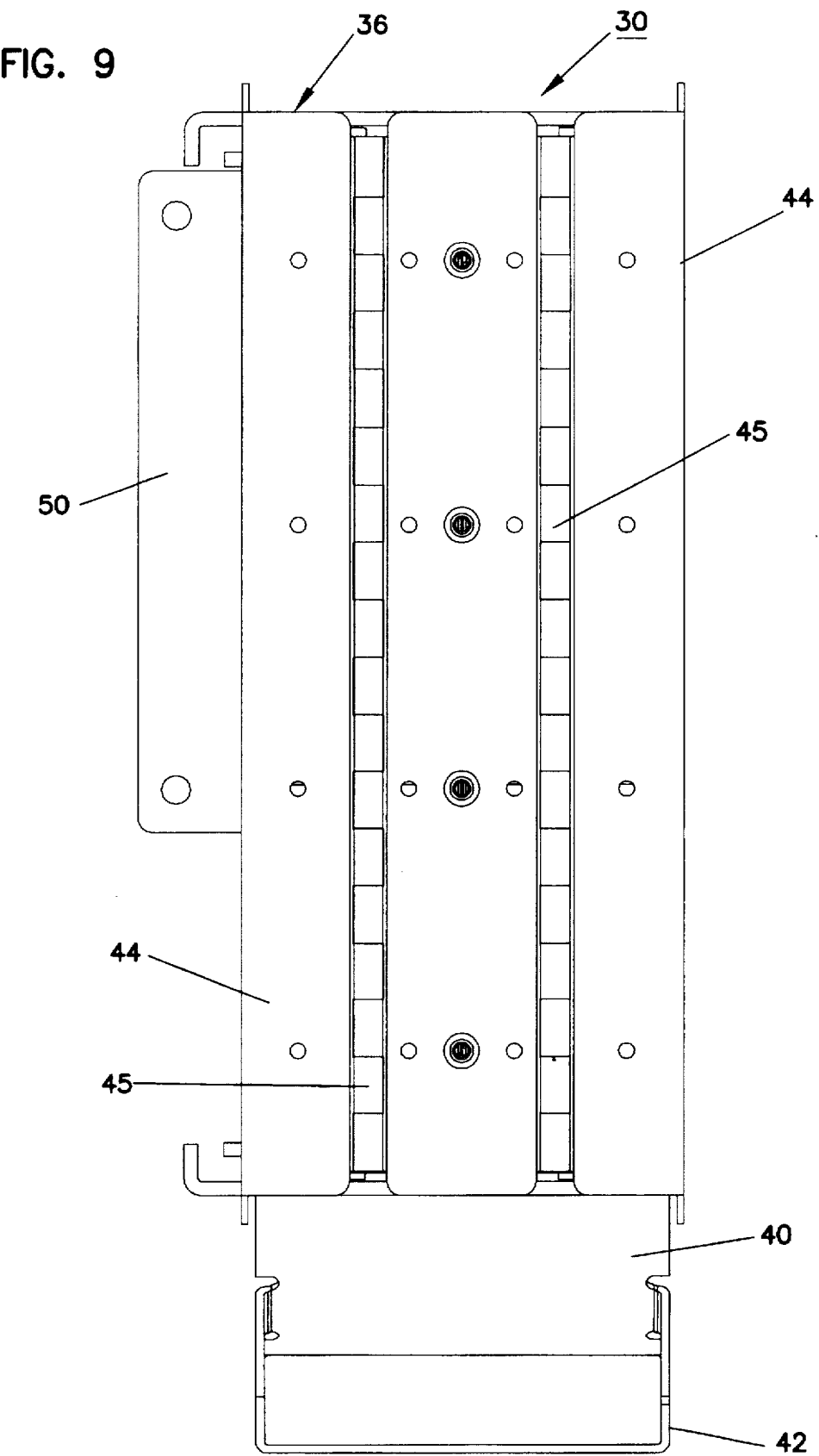
FIG. 9 is a front elevation view of the connector assembly of FIG. 7.

With the structure thus described, a plurality of individual fibers from cables, such as equipment fiber optic cables and the like may be passed through the fanning clips 46 and secured to individual adapters aligned in linear arrays on each of modules 38. Jumper or cross-connect cables or the like may extend from the front of each of the modules 38 and be looped around the radius limiters 40 and extend rearwardly toward the troughs 18. When it is desired to have access to the fiber optic connectors, the doors 44 may be opened and the individual module halves 38a may be moved horizontally to permit ease of access to change the connections as desired A plurality of secondary troughs are provided to direct fibers between the assemblies 30–35, 30'–35' and the rear troughs 18 and central trough 20. The secondary troughs are all horizontal and include rearwardly extending distribution troughs 60 and inwardly extending branch troughs 62 (both best shown in FIG. 6).

The distribution troughs 60 are positioned beneath each one of assemblies 30–35, 30'–35' and extend from a front end 60a to a rear end 60b. The ends 60a, 60b are each provided with radius limiters 64 to prevent excessive bending of fibers passing through ends 60a, 60b. Clips 66 retain fibers within the troughs 60.

The front end 60a is aligned with the retaining clip 42 beneath each assembly 30–35, 30'–35'. The rear end 60b is open into an aligned rear trough 18. The distribution troughs 60 run perpendicularly to rear troughs 18.

Each distribution trough 60 is provided with an individual one of the branch troughs 62. The branch troughs 62 are parallel to the rear troughs 18 and extend from the distribution troughs 60 toward the central trough 20.

The branch troughs 62 are connected to and in communication with the distribution troughs 60. At the point of connection of troughs 60,62, radius limiters 70 are provided to prevent excessive bending of fibers passing between the troughs 60,62.

Figure 4:
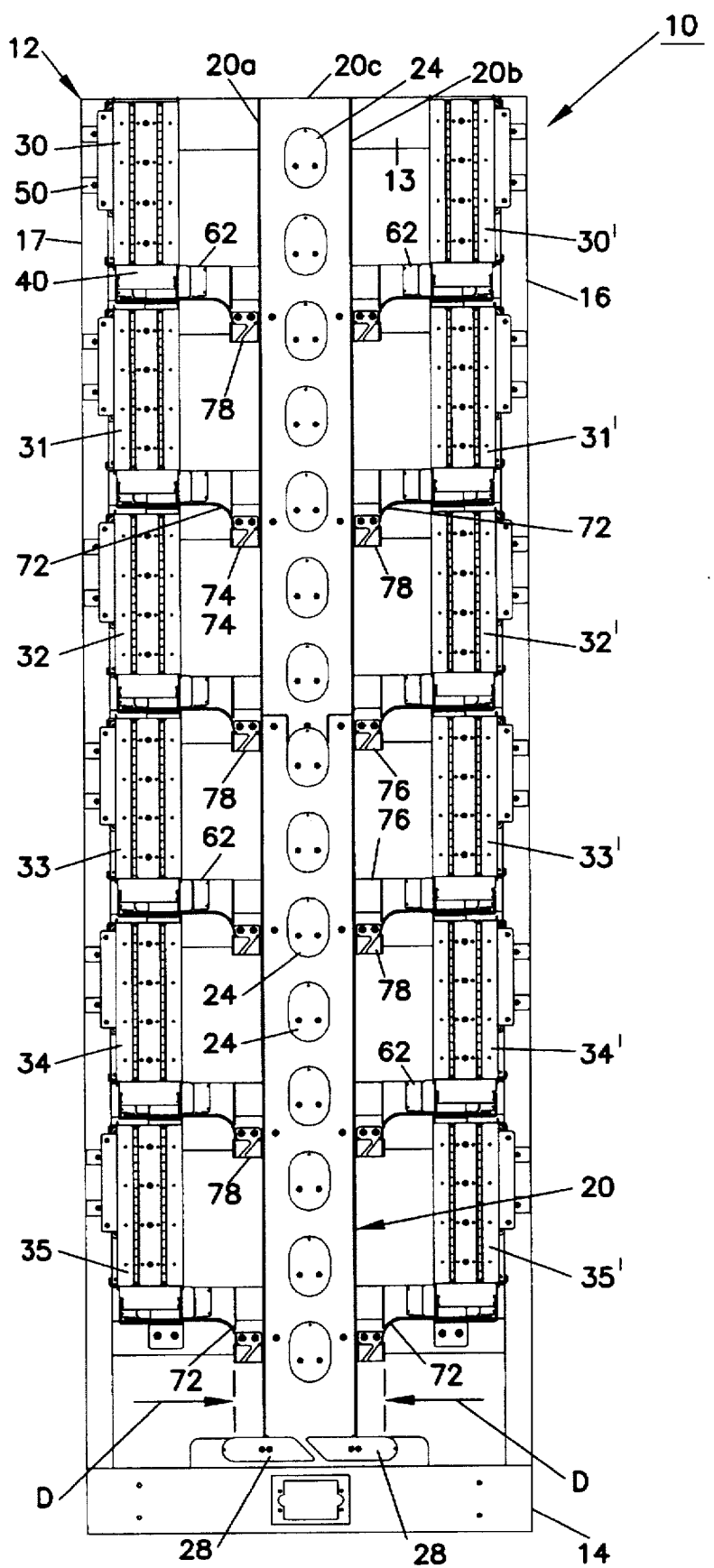
FIG. 4 is a front elevation view of the frame of FIG. 1.
Figure 5:
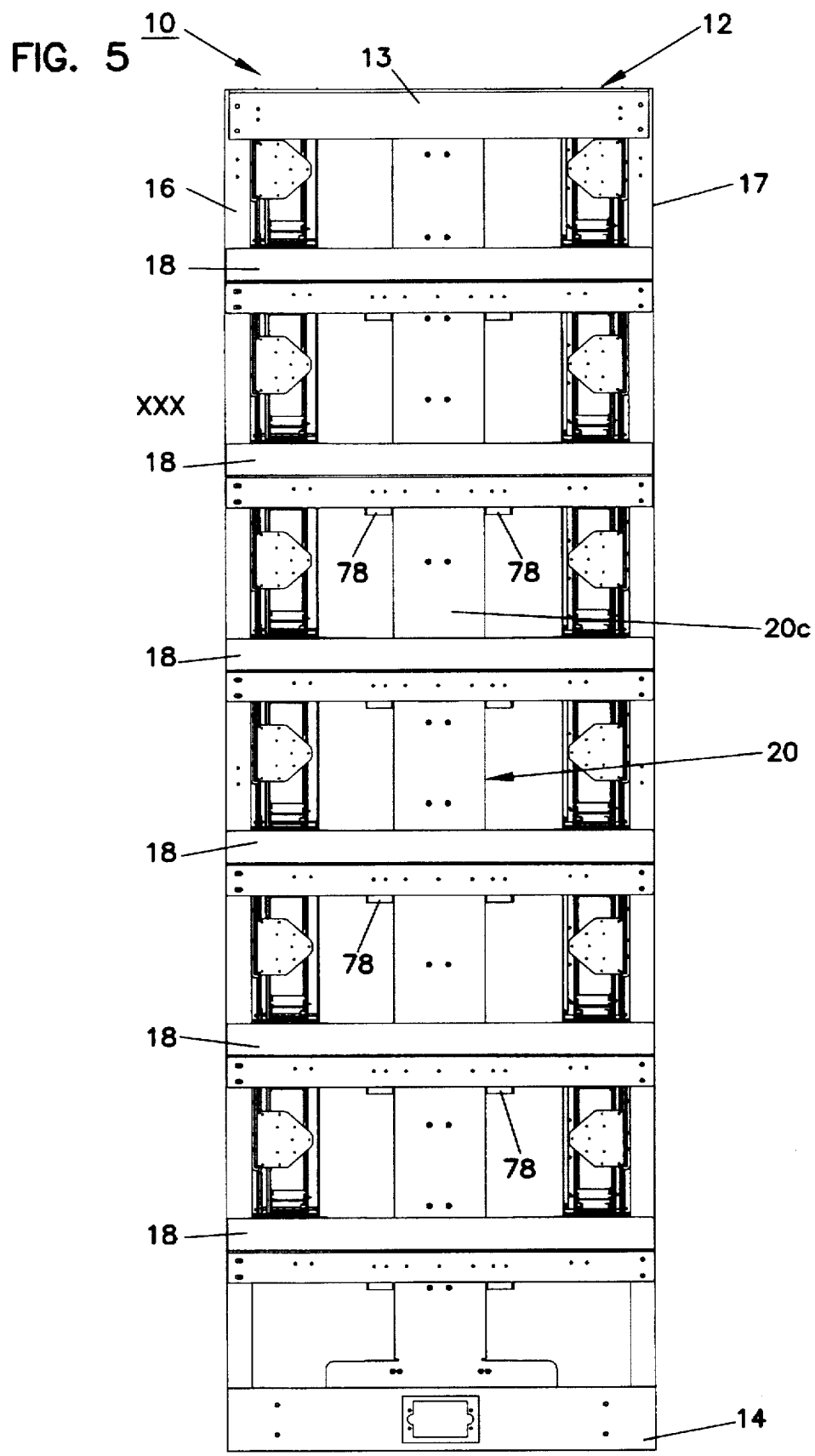
FIG. 5 is a rear elevation view of the frame of FIG. 1.

The branch troughs 62 terminate spaced from the sidewalls 20a, 20b of central trough 20 as indicated by the distance, D, shown in FIG. 4. At their terminal ends, the troughs 62 are provided with radius limiters including a downwardly turned radius limiter 72.

The branch troughs 62 associated with assemblies 30–35 are spaced and vertically aligned such that the spacings from the ends of troughs 62 to wall 20a of central trough 20 define a continuous and unobstructed vertical drop 74 running along the length of sidewall 20a to base 14. Similarly, the branch troughs 62 associated with assemblies 30'–35' are so-aligned and spaced from wall 20b to define a second vertical drop 76 extending the length of sidewall 20b to base 14. A plurality of split retainer clips 78 are provided to retain fibers within the vertical drops 74,76 while permitting selected removal of fibers from the vertical drops 74,76.

With the construction thus described, a fiber can extend forwardly from the front face of the connectors 38 of assembly 30 and be draped around radius limiter 40 and passed into trough 60. The fiber can be exited rearwardly from the frame 12 into the rear horizontal trough 18 for distribution to other apparatus or to trough 60 associated with assembly 31'. Alternatively, the fiber can be passed into trough 62 for downward passage through vertical drop 74.

From vertical drop 74, a fiber can be passed to any of assemblies 31–35 by passing the fiber through the associated ones of troughs 60,62 associated with a selective one of assemblies 31–35. Alternatively, a fiber from vertical drop 74 can be passed beneath vertical trough 70 and passed upwardly through the second vertical drop 76. From the second vertical drop 76, the fiber can be passed to any of assemblies 30'–35' (or even to rear troughs 18) by passing the fiber through associated ones of troughs 60,62.

It will be noted that a fiber cable may be originally installed extending from assembly 30, through first drop 74, up second drop 76 and to assembly 30'. If such a fiber is subsequently disconnected from assembly 30' and reconnected to assembly 35', an excess length of fiber will result. In such an even, the excess length of fiber can be passed upwardly into central trough 20 and looped over a selected one of spools 24.

With the construction thus described, not only is increased density provided in the assembly but increased fiber management permits ready dispersal and repositioning of any fiber from one assembly 30–35, 31'–35' to any other assembly 30–35, 31'–35'. Further, in addition to increased organization, the fibers are fully protected throughout their runs from excess bending. Also, the frame has a plurality of open spaces to permit easy access to a technician.

From the foregoing detailed description of the present invention, it has been shown how the objects of the invention have been attained in a preferred manner. However, modifications and equivalents of the disclosed concepts, such as those which readily occur to one skilled in the art, are intended to be included within the scope of the claims which are appended hereto.

What is claimed is:

1. A fiber distribution frame comprising:

an open support frame defining a vertical support;

a plurality of fiber optic connector assemblies having a rear end adjacent said frame and extending generally perpendicular from said frame to a front end, said assemblies having sides between said rear and front ends with fiber optic contents including fiber optic connectors contained within said assemblies accessible through said sides without substantial movement of said assemblies;

said assemblies secured to said support frame with a first plurality of said assemblies mounted in a generally vertical array on a first side of said frame and with a second plurality of said assemblies mounted in a second vertical array on a second side of said frame;

said assemblies of said first plurality supported in spaced-apart relation to contiguous others of said assemblies of said first plurality to define a first plurality of vertically spaced-apart fiber pathways between contiguous ones of said assemblies of said first plurality and with said fiber pathways extending generally perpendicular to said vertical support plane;

said assemblies of said second plurality maintained in spaced-apart relation to contiguous others of said assemblies of said second plurality to define a second plurality of vertically spaced-apart fiber pathways between contiguous ones of said assemblies of said second plurality and with said second plurality of fiber pathways extending generally perpendicular to said vertical support plane;

said assemblies of said first plurality spaced from said assemblies of said second plurality for opposing sides of said assemblies to define a generally unobstructed vertical passage therebetween with said passage sized to permit direct access to said sides of said assemblies;

a generally vertical array of fiber supports secured to said frame between said first and second pluralities of assemblies with each of said supports adapted to receive a loop of a fiber cable and with said supports accessible through said vertical passage;

a plurality of fiber distribution troughs within said first and second plurality of fiber pathways and extending from said front ends to said rear ends of said first and second pluralities of assemblies;

a plurality of branch troughs at said rear ends and extending from said fiber distribution troughs toward said fiber supports;

a plurality of vertical runs in communication with said branch troughs and in communication with said fiber supports.

2. An apparatus according to claim 1 where each of said troughs includes a radius limiter at a point of transition from said troughs.

3. A fiber distribution frame according to claim 1 wherein said support includes a base member having a trough defined therein beneath said fiber supports and beneath said vertical runs.

4. A fiber distribution frame according to claims 1 including a plurality of horizontal troughs connecting horizontally aligned ones of said distribution toughs.

* * * * *